(12) United States Patent
Yamamoto et al.

(10) Patent No.: US 9,083,214 B2
(45) Date of Patent: Jul. 14, 2015

(54) MOTOR

(71) Applicant: Sumitomo Heavy Industries, Ltd., Tokyo (JP)

(72) Inventors: Taizo Yamamoto, Kanagawa (JP); Osamu Nakazaki, Kanagawa (JP); Masato Ikegami, Kanagawa (JP)

(73) Assignee: SUMITOMO HEAVY INDUSTRIES, LTD., Shinagawa-Ku, Tokyo (JP)

( * ) Notice: Subject to any disclaimer, the term of this patent is extended or adjusted under 35 U.S.C. 154(b) by 271 days.

(21) Appl. No.: 13/803,250

(22) Filed: Mar. 14, 2013

(65) Prior Publication Data
US 2013/0257196 A1    Oct. 3, 2013

(30) Foreign Application Priority Data
Mar. 29, 2012   (JP) .................. 2012-077931

(51) Int. Cl.
*H02K 9/19*    (2006.01)
*H02K 1/32*    (2006.01)

(52) U.S. Cl.
CPC ... *H02K 9/19* (2013.01); *H02K 1/32* (2013.01)

(58) Field of Classification Search
USPC .......................... 310/52–54, 57–59, 61, 60 A
See application file for complete search history.

(56) References Cited

U.S. PATENT DOCUMENTS

| | | | |
|---|---|---|---|
| 3,629,628 A * | 12/1971 | Rank et al. ...................... 310/54 |
| 5,189,325 A * | 2/1993 | Jarczynski ....................... 310/54 |
| 6,897,581 B2 * | 5/2005 | Doherty et al. ................. 310/52 |
| 7,456,536 B2 * | 11/2008 | Tanaka et al. ................... 310/90 |
| 2003/0164651 A1 * | 9/2003 | Tornquist et al. .............. 310/61 |
| 2005/0258701 A1 * | 11/2005 | Soitu .............................. 310/179 |
| 2010/0289386 A1 * | 11/2010 | Gerstler et al. ............. 310/60 A |
| 2011/0133580 A1 | 6/2011 | Sugimoto et al. | |

FOREIGN PATENT DOCUMENTS

| | | |
|---|---|---|
| JP | 11041861 A | 2/1999 |
| JP | 2002-34189 A | 1/2002 |
| JP | 2011-83139 A | 4/2011 |
| JP | 2011-120402 A | 6/2011 |

OTHER PUBLICATIONS

Patent Abstracts of Japan, Publication No. 11041861, Publication Date: Feb. 12, 1999 (1 Page).

* cited by examiner

*Primary Examiner* — Thanh Lam
(74) *Attorney, Agent, or Firm* — Buchanan Ingersoll & Rooney PC

(57) ABSTRACT

A motor includes: a rotor including an output shaft; a stator provided with a coil wound around the stator; and a casing configured to accommodate the rotor and the stator and to contain a coolant liquid therein, wherein skews are formed in at least one of the rotor and the stator. A hollow portion extending an axial direction is formed in the output shaft. The hollow portion includes an opening that opens in the casing at an end surface of the output shaft where a liquid surface of the coolant liquid is relatively higher due to rotation of the rotor and that communicates with the casing near an end opposite to the end surface.

7 Claims, 4 Drawing Sheets

MOTOR

BACKGROUND OF THE INVENTION

1. Field of the Invention

The present invention relates to motors in which a coolant liquid is used.

2. Description of the Related Art

Oil bath motors are structured such that a motor and a reducer are encapsulated in spaces communicating with each other and lubricant oil is circulated in the spaces. For example, one prior art discloses rotary electric machine configured such that a rotation shaft of the machine is hollow, and oil-laden coolant is blasted from an external cooling fluid supplying unit to a space located inside a housing and accommodating a rotor, via holes in the rotation shaft.

SUMMARY OF THE INVENTION

One aspect of the present invention relates to a motor including: a rotor including an output shaft; a stator provided with a coil wound around the stator; and a casing configured to accommodate the rotor and the stator and to contain a coolant liquid therein, wherein skews are formed in at least one of the rotor and the stator, wherein a hollow portion extending an axial direction is formed in the output shaft. The hollow portion includes an opening that opens in the casing at an end surface of the output shaft where a liquid surface of the coolant liquid is relatively higher due to rotation of the rotor and that communicates with the casing near an end opposite to the end surface.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

With the technology described in the prior art, it is necessary to circulate the coolant using the cooling fluid supplying unit.

In this background, there is a need to provide a technology capable of circulating cooling liquid in a closed space accommodating a motor, without using an external device such as a pump.

Figure 1:
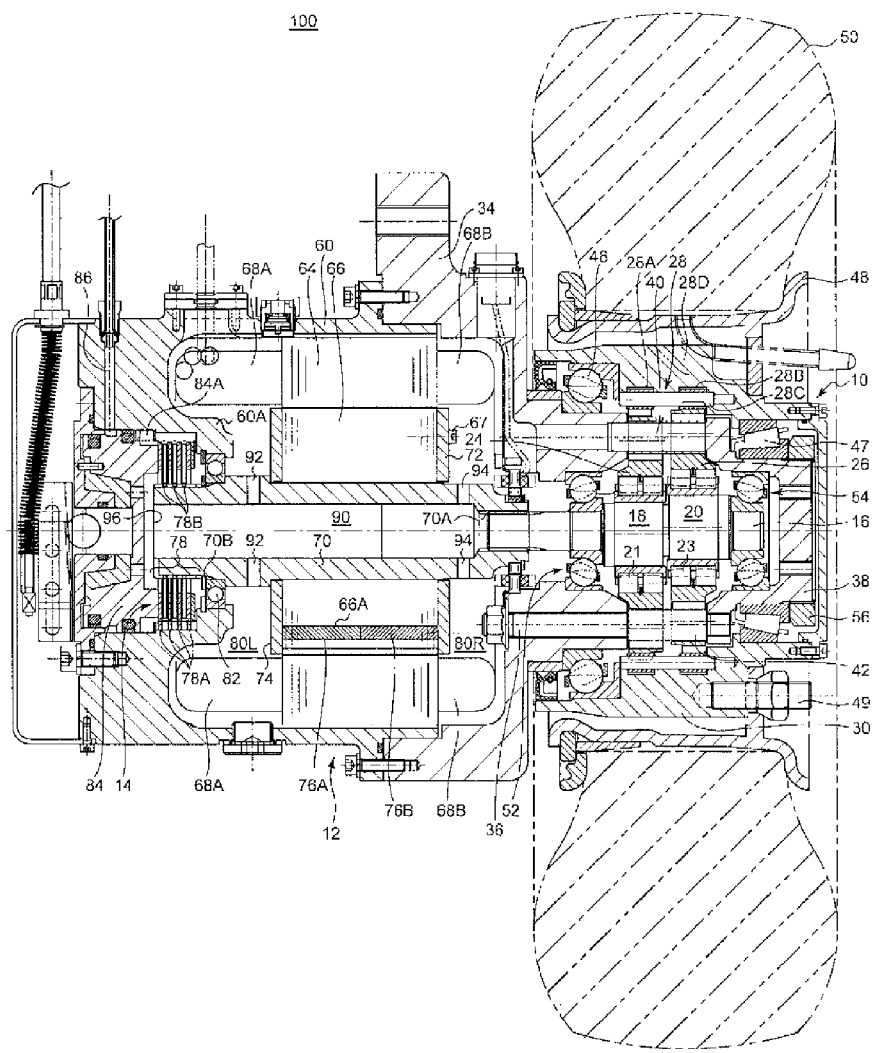
FIG. 1 shows the structure of a power transmission device using a motor according to one embodiment of the present invention built in a wheel of a forklift.

FIG. 1 shows the structure of a power transmission device 100 using a motor according to one embodiment of the present invention built in a wheel of a forklift. FIG. 1 is a cross section that results when the power transmission device 100 is severed by a vertical plane that includes the central axis of the device 100.

The power transmission device 100 includes a reducer 10, an interior permanent magnet (IPM) motor 12, and a brake mechanism 14, and is used to drive the wheels 50 of a utility vehicle independently.

The reducer 10 is a kind of planetary gear reducer of eccentric oscillation and meshing type. An input shaft 16 is located at the radial center of externally-toothed gears 24 and 26 described later. Two eccentric bodies 18 and 20 eccentric relative to the input shaft 16 are formed so as to be integrated with the input shaft 16. The two eccentric bodies 18 and 20 are eccentric relative to each other by a phase difference of 180°. The eccentric bodies 18 and 20 may be configured as components independent of the input shaft 16 and fixed to the input shaft 16 using a key, etc.

Two externally-toothed gears 24 and 26 are oscillatably fitted to the outer circumference of the eccentric bodies 18 and 20, respectively, via roller bearings 21 and 23. The externally-toothed gears 24 and 26 internally mesh with an internally-toothed gear 28.

The internally-toothed gear 28 primarily includes cylindrical internal gear pins 28A and 28B forming internally-toothed gears, retention pins 28C extending through the internal gear pins 28A and 28B and rotatably retaining the pins 28A and 288, and an internally-toothed gear body 28D rotatably retaining the retention pins 28C and integrated with a casing 30.

A first carrier body 34 fixed to a vehicle frame (not shown) is located at the axial end of the externally-toothed gears 24 and 26 toward the vehicle. At the axial end of the externally-toothed gears 24 and 26 away from the vehicle is located a second carrier body 38 integrated with the first carrier body 24 via carrier bolts 36 and carrier pins 42. Internal pins 40 are formed to be integrated with the second carrier body 38.

Twelve through holes having the equal diameter are formed at positions offset from the shaft center of the externally-toothed gear 24 so as to be equidistant from each other. The carrier pins 42 are inserted through three of these through holes equidistant from each other by 120°, and internal pins 40 are inserted through the remaining nine pins, Gear teeth of waveform are formed at the outer circumference of the externally-toothed gear 24. As the gear teeth move on the internal gear pins 28A of the internally-toothed gear 28, maintaining contact with the internal gear pins 28A, the externally-toothed gear 24 is capable of oscillating within a plane defined about a central axis normal to the plane. The externally-toothed gear 26 is similarly structured as the externally-toothed gear 24 except that there is a phase difference of 180°.

The casing 30 of the reducer 10 is rotatably supported via a pair of main bearings 46 and 47 by the first carrier body 34 and the second carrier body 38 secured to the vehicle frame. A wheel member 48 is jointed via bolts 49 to the end surface of the casing 30 away from the vehicle. A tire 50 of a forklift (not shown) is mounted to the wheel member 48. The reducer 10 is accommodated within an axial range of the tire 50 (within the range denoted by a dashed two dotted line of FIG. 1).

The input shaft 16 of the reducer 10 is rotatably supported by the first carrier body 34 and the second carrier body 38 via a pair of angular contact ball bearings 52 and 54 in DF (face-to-face) arrangement.

The main bearings 46, 47 and the angular contact ball bearings 52, 54 in the reducer 10 are open-end bearings and lubricated by a coolant liquid sealed in the casing, as described later.

The IPM motor 12 is provided with a stator 64 and a rotor 66 each configured with magnetic steel sheets. A plurality of air gaps 66A extending in the axial direction is formed in the magnetic steel sheets composing the rotor 66.

Permanent magnets 76A and 7B are embedded in the gaps. IPM motors, in which permanent magnets are embedded in the rotor, have higher efficiency than SPM motors, in which permanent magnets are attached to the surface of the rotor, and are suitable as a motor to drive a forklift. The magnetic steel sheets composing the rotor 66 are integrated with each other by bolts 67 and are integrated with a motor output shaft 70 via an engagement part (not shown). The side of the motor output shaft 70 toward the vehicle is rotatably supported via a bearing 82 by an extension 60A extending inward from a motor casing GO. The side of the motor output shaft 70 away from the vehicle is jointed by the input shaft 16 of the reducer 10 via a spline 70a.

The stator 64 is fixed to the motor casing 60. A coil for forming a magnetic field is wound around the stator 64. The parts of coil that are folded back to provide a winding extend axially from the ends of the stator 64 as coil ends 68A and 68B.

The inner circumferential surface of the stator 64 facing the rotor 66 is formed with skews (not shown) for improving voltage waveform and reducing cogging torque.

Instead of forming skews in the stator 64, skews may be formed on the outer circumferential surface of the rotor 66 facing the stator 64. Alternatively, skews may be formed on both the inner circumferential surface of the stator 64 and the outer circumferential surface of the rotor 66. In the latter case, the direction of twist of the skews in the stator is identical to that of the rotor.

End plates 72 and 74 for preventing the permanent magnet embedded in the rotor from being dislocated while in rotation are fitted to the respective axial end surfaces of the rotor 66. For example, the end plates are made of stainless steel or aluminum.

A hollow portion 90 extending in the axial direction is formed inside the motor output shaft 70. The end of the hollow portion 90 toward the vehicle communicates with a space 80L, at an opening 96. The input shaft 16 of the reducer 10 is inserted at the end of the hollow portion 90 away from the vehicle, as indicated above. The motor output shaft 70 is formed with through holes 92 and 94 that extend in the radial direction and open to the side surface of the output shaft 70, so as to be adjacent to the end plates 74 and 72 at the respective ends of the rotor 66. The through holes 92 and 94 provide communication between the hollow portion 90 and spaces 80L and 80R. At least two through holes 92 and 94 are provided in the circumferential direction of the motor output shaft 70. Preferably three or more through holes are provided in rotation symmetry. However, only one through hole may be provided. In the axial direction, the through holes 92 and 94 are provided such that the openings thereof in the side surfaces of the output shaft 70 are respectively located radially inward from the coil ends 68A and 68B extending at the respective ends of the stator 64.

A helical channel (not shown) with a direction of twist opposite to that of the skew on the inner circumferential surface of the stator or the outer circumferential surface of the rotor is formed on the inner circumferential surface of the output shaft 70. The helical channel functions as a means to guide the coolant liquid, which enters the hollow portion 90 via the opening 96, away from the vehicle, i.e., from the side of the space 80L, toward the side of the space 80R, which will be described later in detail.

The brake mechanism 14 puts a brake on the rotation of the output shaft 70. The brake mechanism 14 is accommodated interior to the coil end 68A of the coil wound around the stator 64 in the radial direction. The brake mechanism is provided with a multi-plate brake 78 having a plurality of friction plates. The friction plates of the multi-plate brake 78 includes a plurality of (four, in the illustrated case) fixed friction plates 78A and a plurality of (three, in the illustrated case) rotatable friction plates 78B.

The fixed friction plates 78A are fixed in the circumferential direction between a brake piston 84 located to block the rear end of the motor casing 60 of the IPM motor 12 and the extension 60A of the casing 60 by thorough pins (not shown). The fixed friction plates 78A are movable in the axial direction along the thorough pins.

Meanwhile, the rotatable friction plates 78B are built in the output shaft 70, which is rotated as one piece with the rotor 66, and is rotatable as one piece with the output shaft 70. A spline 70B is formed in the axial direction at the outer circumference of the output shaft 70. The inner circumferential ends of the rotatable friction plates 783 are engaged with the spline 703. This allows the rotational friction plates 783 to be integrated with each other in the circumferential direction via the output shaft 70 and the spline 70B and to be movable in the axial direction of the output shaft 70. A friction sheet (not shown) is adhesively attached to the surface of the rotatable friction plates 78B.

The brake piston 84 is located to oscillate in a cylinder that communicates with a hydraulic mechanism (not shown) via an oil passage 86. When the operator of the forklift performs a braking maneuver, pressurized oil is supplied from the hydraulic mechanism to the cylinder via the oil passage 86, and the brake piston 84 pressurizes the fixed friction plate 78A closest to the vehicle in the axial direction.

The rotor 66 of the IPM motor 12, the output shaft 70, the friction plates 78A, 78B of the brake mechanism 14, the input shaft 16 of the reducer 10, the casing 30 (output shaft of the reducer 10), and the wheel member 48 are located coaxially.

The IPM motor 12 and the brake mechanism 14 are formed as wet mechanisms, and the interior spaces of the reducer 10, the IPM motor 12, and the brake mechanism 14 communicate with each other to form a single, closed space. The coolant liquid is sealed in this space and can flow through the space. The coolant liquid not only functions to cool the rotor 66 and the stator 64 of the IPM motor but also functions as a lubricant for the bearings and slide portions inside the reducer and the motor.

A description will now be given of the operation of the power transmission 100 performed when the IPM motor 12 is driven.

When the operator of the forklift maneuvers the forklift to move forward or backward, the rotor 66 and the output shaft 70 are rotated relative to the stator 64 of the IPM motor 12. The rotation of the output shaft 70 is transmitted to the input shaft 16 of the reducer 10 via the spline 70A. When the input shaft 16 is rotated, the outer circumferences of the eccentric bodies 18 and 20 move eccentrically, causing the externally-toothed gears 24 and 26 to oscillate via the roller bearings 21 and 23. The oscillation causes the positions of meshing between the outer teeth of the externally-toothed gears 24, 26 and the internal gear pins 28A, 28B of the internally-toothed gear 28, respectively, to be shifted successively.

The difference in the number of teeth between the externally-toothed gears 24, 26 and the internally-toothed gear 28 is defined to be "one". The rotation of the externally-toothed gears 24 and 26 is restrained by the internal pins 40 fixed to the first carrier body 34, which is fixed to the vehicle frame. Therefore, each time the input shaft 16 is rotated 360°, the internally-toothed gear 28 is rotated relative to the externally-toothed gears 24 and 26, the rotation of which is restrained, by an angle defined by the difference in the number of teeth. As a result, the rotation of the input shaft 16 causes the casing 30 integrated with the internally-toothed gear body 28D at a rotational speed reduced by 1/(the number of teeth of the internally-toothed gear). The rotation of the casing 30 causes the tire 50 of the forklift to be rotated via the wheel member 48 fixed to the casing 30 by the bolts 49.

A description will now be given of the braking operation of the power transmission device 100 performed by the brake mechanism 14.

When the operator of the forklift performs a braking maneuver, pressurized oil is supplied from the hydraulic mechanism to the cylinder via the oil passage 86, causing the brake piston 84 to move away from the vehicle (toward right in the figure) within the cylinder. As a result, the fixed friction plate 78A closest to the vehicle is pressurized by the brake piston 84 to move away from the vehicle. Then, the plurality of fixed friction plates 78A and the rotatable friction plates 78B come into contact with each other successively with a strong force. As described above, the fixed friction plates 7BA are fixed in the circumferential direction via the through pins, and the rotatable friction plates 78B are integrated with the output shaft 70 in the circumferential direction via the spline 70B built in the output shaft 70. Therefore, as a result of the friction plates 78A and the rotatable plates 78B being in strong contact with each other via the friction sheets adhesively attached to the rotatable friction plates 783, the brake action of the output shaft 70 is exerted.

When the operator stops the braking maneuver, the supply of the pressurized oil in the cylinder is stopped. Consequently, the restoring force of a spring 84A interposed between the extension 60A and the brake piston 84 returns the brake piston 84 toward the vehicle, causing the fixed friction plates 78A to return to the initial axial positions. In association with this, the rotatable friction plates 783 also return to the initial axial positions, causing the fixed friction plates 78A to lose contact with the rotatable friction plates 78B and causing the brake action to disappear.

Figure 2:
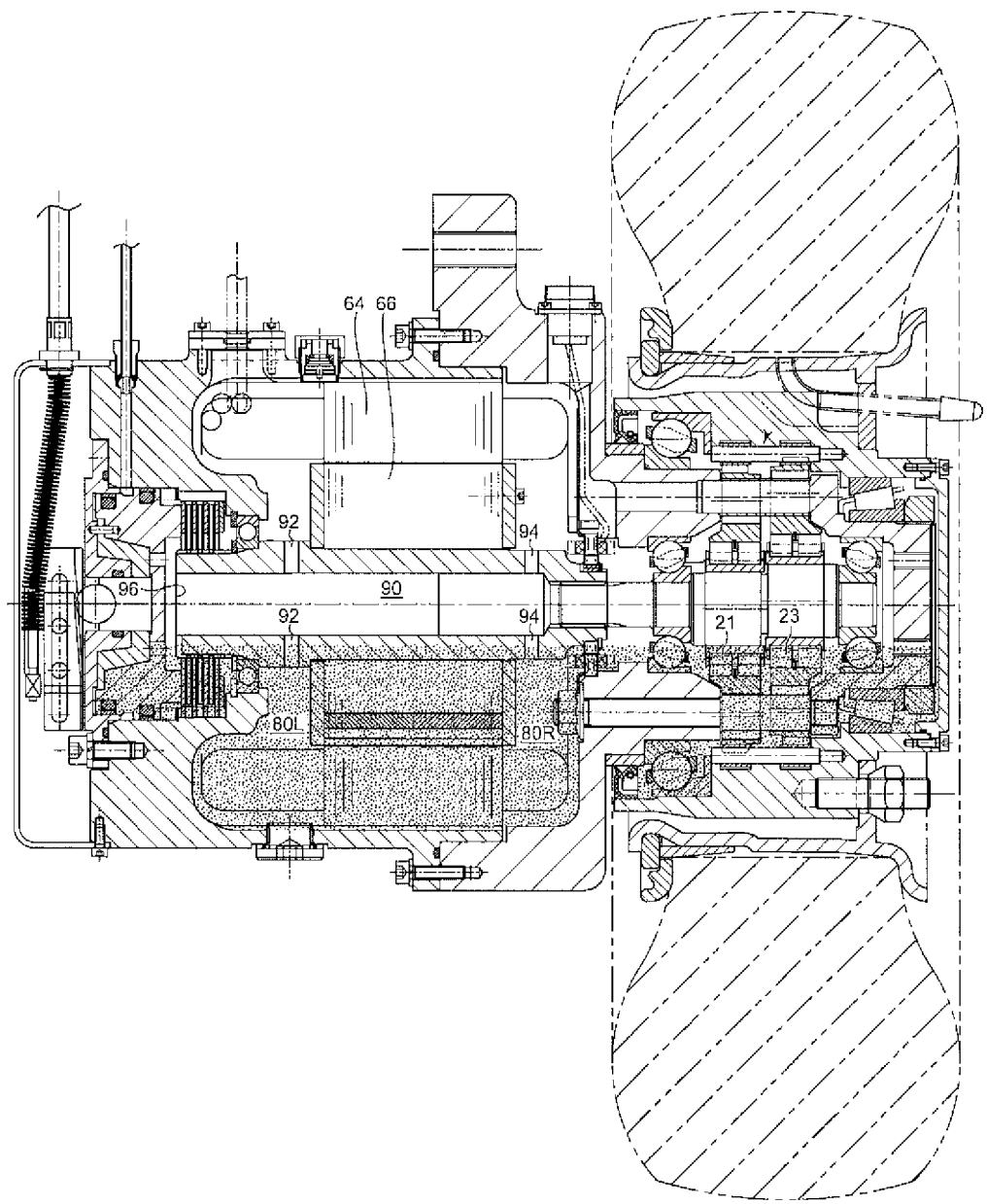
FIG. 2 shows the liquid surface of the coolant liquid occurring when the motor is not in operation.

FIG. 2 shows the liquid surface of the coolant liquid (lubricant) occurring when the motor is not in operation. The shaded portion in the figure indicates the coolant liquid. As shown in the figure, according to the embodiment, the coolant liquid of an amount sufficient to immerse parts of the bearing 82 of the IPM motor 12, the roller bearings 21 and 23 of the reducer 10, and the angular contact ball bearings 52 and 54 in the liquid is sealed in the casings 30 and 60 with the central axis being horizontal.

Figure 3:
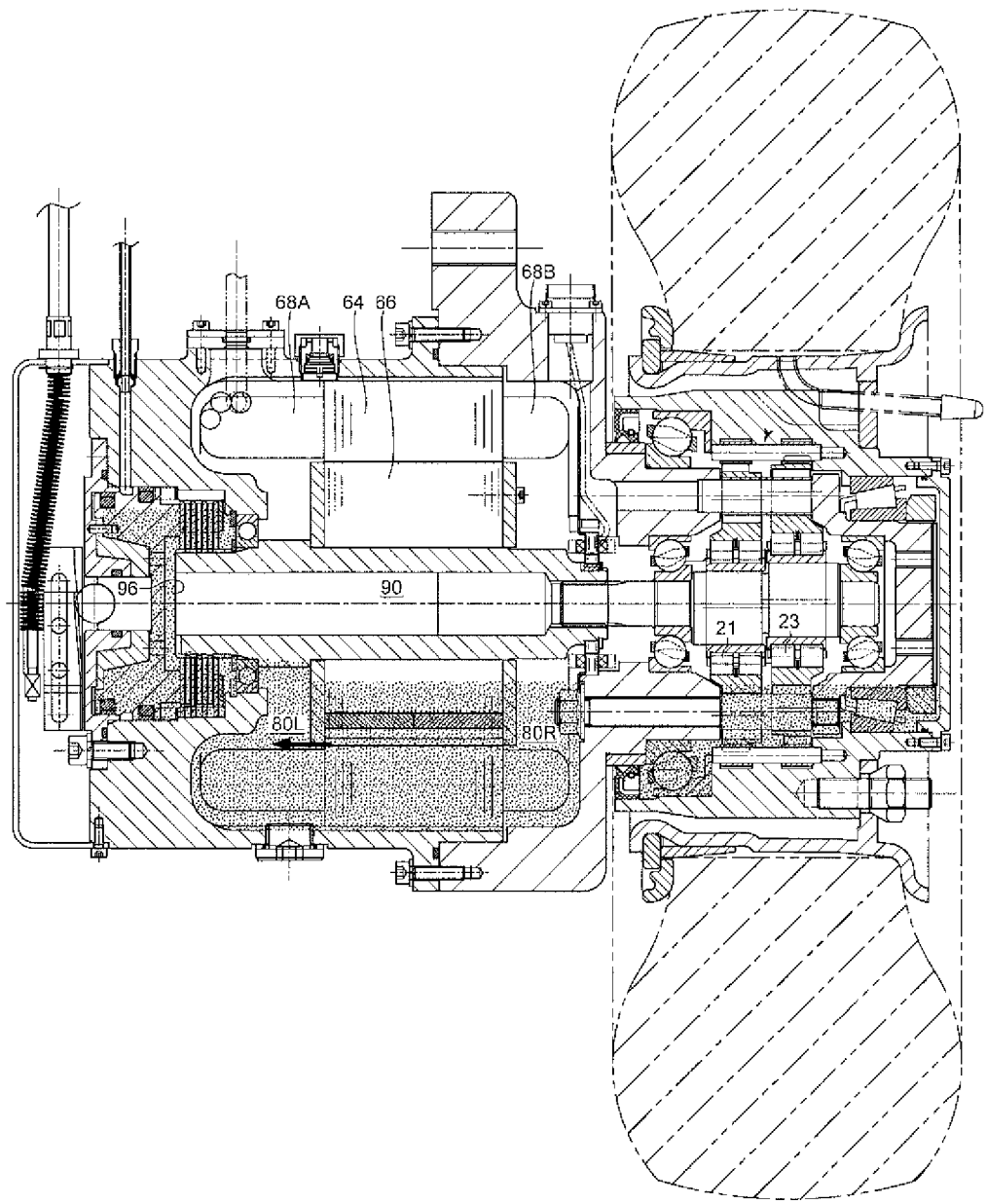
FIG. 3 shows how the liquid surface varies when the prior art motor in which a through hole is not formed in the motor shaft is operated.

FIG. 3 shows how the liquid surface varies when the prior art motor in which a through hole is not formed in the motor shaft is operated. When the rotor is rotated, the coolant liquid is drawn to the surface of the rotor due to its viscosity and begins to flow in a direction identical to the direction of rotation. In particular, the coolant liquid located in the gap between the rotor and the stator is pushed by the skews formed on the inner circumferential surface of the stator or the outer circumferential surface of the rotor in an axial direction defined by the skews. If the direction of skews is defined to create a flow in an axial direction toward the vehicle, the height of the liquid surface differs in the space SOL toward the vehicle from that of the opposite space 80L, as shown in FIG. 3. If this phenomenon occurs, the roller bearings 21 and 23 and the angular contact ball bearings 52 and 54 in the reducer 10 may not be immersed in the coolant liquid as shown in FIG. 3 so that sufficient lubrication performance may not be provided.

If the volume of coolant liquid is small, only the lower half of the coil, the primary heat source of the motor, will be immersed in the coolant liquid. Therefore, the upper half of the coil cannot be cooled and the motor would lack heat radiation performance.

In order to increase the cooling performance of the motor, the amount of contact of the coolant liquid with the upper half of the coil need be increased. If the method of increasing the amount of coolant liquid sealed in the casing is employed for this purpose, the rotational load of the rotor due to the viscocity resistance of the coolant liquid will be increased so that the motor efficiency will be lowered.

In this embodiment, the aforementioned problem is solved by forming the motor output shaft having a hollow portion with a through hole that extends in the radial direction of the output shaft and that opens at the side surface of the shaft.

Figure 4:
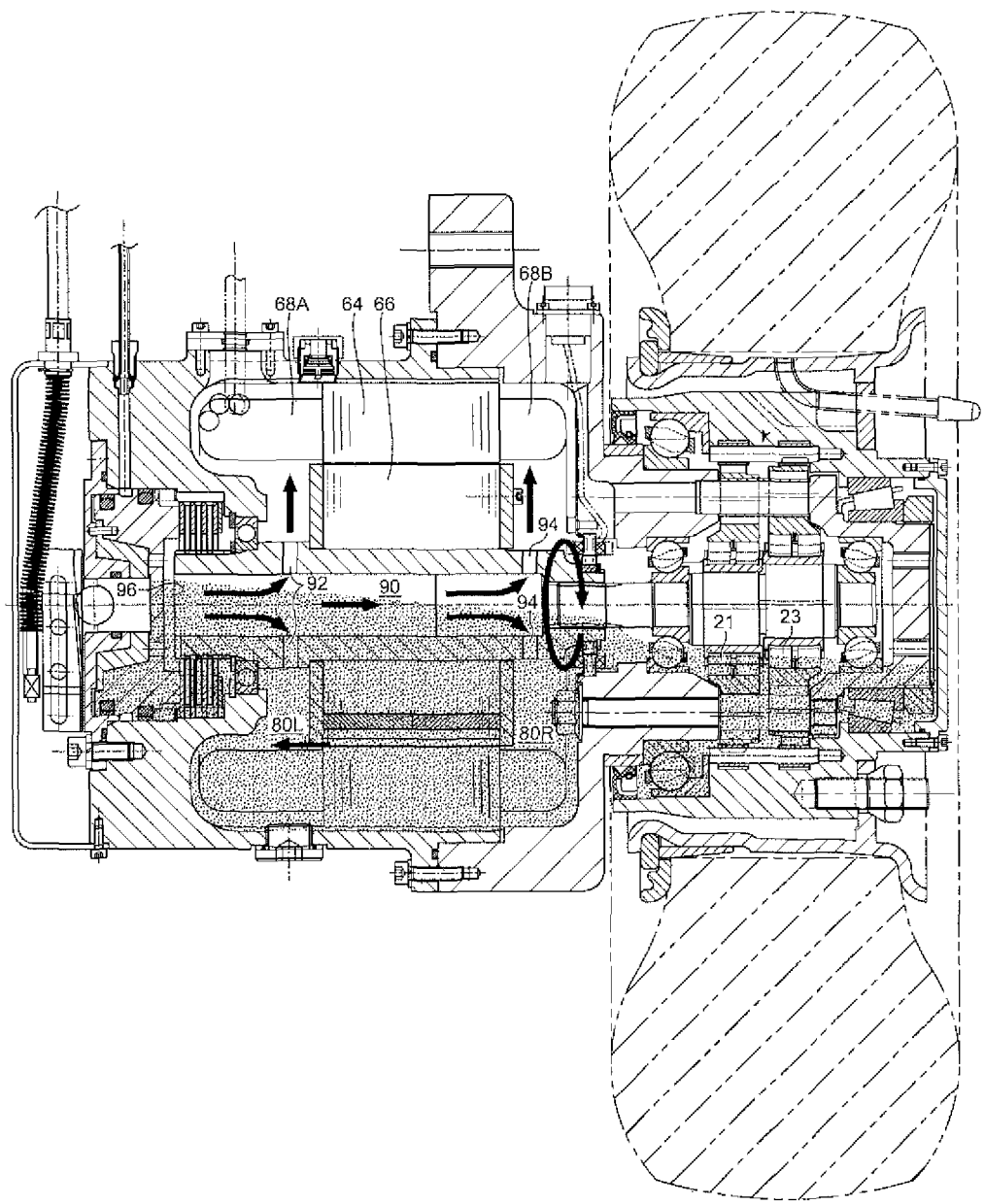
FIG. 4 shows how the liquid surface varies when the motor according to the embodiment is operated.

FIG. 4 shows how the liquid surface varies when the motor according to this embodiment is operated. The arrows in the figure indicate the directions of flow of the coolant liquid and the direction of rotation of the output shaft. As the rotor 66 is rotated due to the electromagnetic action between the stator and the rotor, the coolant liquid is drawn to the surface of the rotor due to its viscosity and begins to flow in a direction identical to the direction of rotation of the rotor, same as in FIG. 3. The coolant liquid located in the gap between the rotor and the stator is pushed by the skews formed on the inner circumferential surface of the stator or the outer circumferential surface of the rotor in an axial direction defined by the skews.

As the rotational speed of the rotor is increased and the liquid surface of the coolant liquid in the space 80L toward the vehicle becomes higher than the lower end of the opening 96 of the motor output shaft 70, the coolant liquid flows into the hollow portion 90. Due to the rotation of the helical channel formed on the inner circumferential surface of the output shaft, a flow of the coolant liquid that causes the coolant liquid to move on the inner circumferential surface from the opening 96 toward the vehicle to the shaft end opposite to the vehicle is created.

The centrifugal force exerted on the output shaft 70 causes a portion of the coolant liquid moving on the inner circumferential surface of the output shaft 70 to pass through the through holes 92 and 94 and to spread in droplets toward the coil ends 68A and 68B located above the through holes 92 and 94. Droplets of the coolant liquid spread via the through holes 92 and 94 are attached to the coil ends 68A and 68B and deprive the coil of heat before falling on the liquid surface by gravitation. Droplets of the coolant liquid spread via the through holes 94 are supplied to the reducer, bypassing the output shaft 70. The remainder of the coolant liquid is supplied to the reducer 10 via the gap of the spline 70.

The action of the hollow portion 90 to transport the coolant liquid prevents the liquid surface in the space 80L toward the vehicle from becoming excessively higher than the liquid surface in the opposite space 80R, ensuring that the liquid surface on the left side approaches that of the right side. As a result, the roller bearings 21 and 23 and the angular contact ball bearings 52 and 54 in the reducer 10 will also be immersed in the coolant liquid to provide sufficient lubrication performance.

While FIG. 4 shows that the inner diameter of the hollow portion is constant, the inner diameter may not be constant.

For example, the diameter may be smaller toward the end surface away from the vehicle than at the end surface toward the vehicle.

The figure also depicts the inner diameter of the through holes 92 and 94 extending in the radial direction as being constant. Alternatively, the through holes may be formed such that the opening at the inner circumferential surface is larger than the opening at the side surface. This enhances the speed of spreading of the coolant liquid via the through holes.

Further, the through holes 92 and 94 may not extend in a direction perpendicular to the central axis but may extend at an angle. This allows droplets of the coolant liquid to be spread to coil end portions other than the portions immediately above the opening at the side surface.

Where a plurality of through holes 92 and a plurality of through holes 94 are provided, the angle of inclination may be different from one through hole to another. This allows droplets of the coolant liquid to be spread in an extensive range over the coil ends.

Which of the liquid surface in the space 80L at one end of the rotor or that of the space 80R at the other end is higher depends on the direction of rotation of the rotor, and the direction of skews on the inner circumferential surface of the stator or the outer circumferential surface of the rotor. Since the coolant liquid is introduced in the hollow portion 90 via the opening 96 according to this embodiment, the liquid surface in the space 80L needs to be higher than that of the space 80R. It is therefore preferable to define the direction of skews on the inner circumferential surface of the stator or the outer circumferential surface of the rotor so that a flow of the coolant liquid toward the space 80L is created in association with the direction of rotation of the rotor that is frequently used. In the case that a forklift is operated by the power transmission device 100, the direction of rotation of the rotor that is frequently used is the direction of rotation corresponding to the forward movement of the forklift.

It is preferable to measure a difference in liquid surface level between the spaces 80L and 80R at the respective ends of the rotor occurring when the rotor is driven at a predetermined rotational speed (preferably, when the rotor is driven at a high, frequently-used speed) and to optimally design the amount of coolant liquid sealed in the casings 30 and 60 such that a proper amount of coolant liquid is found in the reducer side even when the motor is operated at the predetermined rotational speed.

FIG. 4 shows that the end of the motor output shaft 70 away from the vehicle is coupled to the input shaft 16 of the reducer 10 via the spline 70A. Alternatively, a larger opening may be provided at the end of the motor output shaft 70 away from the vehicle by coupling the input shaft 16 of the reducer 10 to the motor output shaft 70 by using other means (e.g. by using a coupling). Still alternatively, the motor output shaft 70 may be coupled to the input shaft 16 so as to completely close the end away from the vehicle. Even in the latter case, since droplets of the coolant liquid spread via the through hole 94 are supplied to the reducer 10 by bypassing the output shaft 70, there will not be shortage of the coolant liquid in the reducer 10. Even if the motor output shaft 70 is coupled to the input shaft 16 of the reducer 10 via a spline, the end of the motor output shaft away from the vehicle can be completely closed by using a spline with little gap or by with interference fit.

Still alternatively, the inner circumferential surface of the motor output shaft 70 may be configured as a flat surface instead of being formed with a helical channel. This is because, if a difference in liquid surface level of the coolant liquid is created between the ends of the rotor, the associated difference in potential energy of the liquid surface between the space 80L toward the vehicle and the space 80R away from the vehicle causes the coolant liquid to be transferred from the vehicle side to the side away from the vehicle via the hollow portion 90 even if a helical channel is not provided. Instead of or in addition to forming a helical channel, an impeller may be provided in the hollow portion 90 to create a flow of the coolant liquid from the vehicle side to the side away from the vehicle.

As described above, the difference in liquid surface level of the coolant liquid between the ends of the rotor, created by the rotation of the rotor and the skews on the inner circumferential surface of the stator or the outer circumferential surface of the rotor, could be taken advantage of to guide the coolant liquid into the hollow portion via the opening at the end surface of the output shaft and to transport the coolant liquid from the side with a higher liquid surface level to the side with a lower liquid surface level via the hollow portion. Therefore, the difference in liquid surface level between the ends of the rotor can be reduced to immerse the slide portions of the motor and the reducer in the coolant without using an external device such as a pump.

Since the centrifugal force exerted on the output shaft causes the coolant liquid to be spread toward the coil ends via the through holes formed in the hollow portion, the coil ends can be cooled efficiently even if the amount of coolant liquid sealed in the casings is small (e.g. even if the amount is just sufficient to immerse a part of the lower half of the rotor when the output shaft is positioned horizontally). This prevents the resistance of stirring met when the rotor is rotated from being increased due to an increase in the amount of coolant liquid.

It has been described in the foregoing about some embodiments of the invention. It will be obvious to those skilled in the art that these embodiments are intended to be illustrative only and various modifications to constituting elements and processes could be developed and that such modifications are also within the scope of the present invention.

The structure where the brake mechanism is provided toward the vehicle side of IPM motor is described by way of example. Alternatively, the present invention can be equally applied to the structure where the brake mechanism is provided between the reducer and the IPM motor. The present invention can also be applied to any type of oil bath motors having other structures where the coolant liquid of the motor also serves as the lubricant in the slide portions such as bearings.

A reducer mechanism of oscillating and internally meshing type is used in the embodiments above. However, the reducer mechanism of the reducer used in combination with the motor according to the embodiments is not limited to the one described. For example, the reducer may have other reducer mechanisms such as a simple planetary gear reducer mechanism. The reducer may not necessarily have a single-stage reducer mechanism in which the input shaft and the output shaft are coaxial. Alternatively, the reducer mechanism may include multiple shafts or multiple stages.

In the embodiments above, it has been described that the motor according to the invention is used in combination with a planetary gear reducer of eccentric oscillation and meshing type in which the input shaft (eccentric body shaft) 16 is provided at the center of the internally-toothed gear 28. Alternatively, the motor according to the present invention can be used in combination with a planetary gear reducer of a type in which several eccentric body shafts are provided at positions offset from the center of the internally-toothed gear.

In the embodiments above, it has been described that the planetary gear reducer of eccentric oscillation and meshing type is configured to fix the first carrier body 34 and the second carrier body 38 and to output rotation from the casing 30. Alternatively, the planetary gear reducer may be configured to fix the casing 30 and to output rotation from the first carrier body 34 and the second carrier body 38. In this case, the spin component of the externally-toothed gears 24 and 26 is transmitted to the first carrier body 34 and the second carrier body 38 via the internal pins 40.

The motor according to the present invention is not limited to be used to drive the wheels of a utility vehicle such as a forklift, but may be applied to any application.

Priority is claimed to Japanese Patent Application No. 2012-077931, filed Mar. 29, 2012, the entire content of which is incorporated herein by reference.

What is claimed is:

1. A motor comprising:
 a rotor including an output shaft;
 a stator provided with a coil wound around the stator; and
 a casing configured to accommodate the rotor and the stator and contain a coolant liquid therein,
 wherein skews are formed in at least one of the rotor and the stator,
 wherein a hollow portion extending an axial direction is formed in the output shaft, and
 wherein the hollow portion includes an opening that opens in the casing at an end surface of the output shaft where a liquid surface of the coolant liquid is relatively higher due to rotation of the rotor and that communicates with the casing near an end opposite to the end surface.

2. The motor according to claim 1,
 wherein the hollow portion opens in the casing at both ends of the output shaft.

3. The motor according to claim 1,
 wherein a through hole extending from the hollow portion in a radial direction of the output shaft acid opening at a side surface of the output shaft is formed.

4. The motor according to claim 3,
 wherein an inner diameter of the through hole is larger at the hollow portion than at the side surface of the output shaft.

5. The motor according to claim 3,
 wherein an opening of the through hole at the side surface of the output shaft is located radially inward from coil ends extending at respective ends of the stator.

6. The motor according to claim 1,
 wherein a guidance means for guiding the coolant liquid from a side with a higher liquid surface level to a side with a lower liquid surface level is formed in the hollow portion.

7. The motor according to claim 6,
 wherein the guidance means is a helical channel formed in an inner circumferential surface of the output shaft.

* * * * *